Patented Sept. 8, 1936

2,053,281

UNITED STATES PATENT OFFICE 2,053,281

EXPANSION JOINT

George B. Gaiennie, Chicago, Ill., assignor to Elastic Asphalt Company, Chicago, Ill., a corporation of Illinois No Drawing. Application May 1, 1933, Serial No. 668,832

6 Claims. (Cl. 106—23)

My invention relates to expansion joints and also to an expansion joint material and method of producing the same.

For various reasons, it is found necessary or advisable to provide a bonding joint of compressible and expansible material between structural members. The most commonly occurring example is in concrete paving. Such paving is laid in sections with a space left between the sections to allow for expansion of the sections during warm weather and proper contraction of the section during cold weather. Some material is customarily inserted in this space, in theory a material being employed which will so allow for the contraction and expansion that the space will remain closed and foreign matter will be prevented from entering. There are other situations in which expansion joints are required, examples of which will be referred to hereinafter. No fully satisfactory joint has yet been devised for connecting two structural members of the character indicated nor has any satisfactory and sufficiently inexpensive material been made available for use in such joints.

The principal object of my present invention is the provision of an improved expansion joint.

Another object is the provision of an improved material adapted for use in such joints.

A further object is the provision of an expansion joint adapted for use between substantially any types of structural members under varying conditions.

Other objects and features of the invention will be apparent from a consideration of the following detailed description.

Before proceeding to a description of the joint itself, I shall describe a joint material in the nature of a molding compound which I may employ in producing the joint. This material comprises in general a combination of rubber and asphalt so compounded that the extensibility and compressibility of the rubber is taken advantage of and the bonding and adhesive properties of the asphalt, modified in a manner to be described, assists in holding the material in place. Preferably the rubber is in the form of aggregates of varying sizes from for example one-fourth inch down to sizes ranging from one-sixteenth of an inch to one-eighth of an inch. These sizes may vary somewhat depending upon the specific use to which the material is put.

One of the difficulties in compounding rubber and asphalt is to obtain a proper bond between the two materials. To obtain this bond, I preliminarily coat the rubber aggregates with a bonding material and subsequently disperse the coated rubber aggregate or particles with asphalt, either in the form of an emulsion or hot liquid asphalt as determined by the requirements of the final material.

I first select a rubber, which may be old or reclaimed rubber and preferably of a type known as semi-soft. I then disperse the rubber particles in a relatively small amount of an asphalt emulsion to which asphalt emulsion a proportion of latex has been added. I may also add a suitable oil such as pine oil in relatively small proportions to the asphalt emulsion. The pine oil may be present in proportions from ½% to 5%, and when employing a 40% rubber latex, the latex may be present from approximately 2% to 25% of the emulsion.

When the emulsion with the added material has been mixed thoroughly with the rubber so as to coat the same fully, I spread the resulting mixture out to dry or use any of the usual expedients to drive off the bulk of the moisture and leave a substantially dry friable product.

The resulting material is readily crumbled up and will be found to have a somewhat tacky coating around the individual particles of rubber. This intermediate material is then dispersed in a relatively larger amount of asphalt or asphalt emulsion to produce the final joint material. When employing an asphalt emulsion, I may use from approximately three to eight pounds of the rubber material to one gallon of asphalt. When employing hot liquid asphalt, I may also vary the proportions of rubber, but in general the amount of rubber used is somewhat less. The material is then either poured or inserted in any other suitable way into the crack, space, or area which is to be filled or covered. It will be understood that when the treated rubber is dispersed in the asphalt emulsion, the resulting substance will set by the drying out of the moisture. When the rubber material is dispersed directly in the asphalt, however, the entire composition must be heated as a rule to apply it in position. It may be heated to a temperature above that required to render the asphalt liquid without burning the rubber. The hot asphalt composition sets, of course, when it cools.

I may employ substantially any of the usual good grades of asphalt in preparing my bonding or joint material. In first coating the rubber, however, I have found that I obtain improved results if I use an asphalt which is slightly on the alkaline side, but which contains no soap fat or oily material or saponifying agent. For best results, an asphalt emulsion of this kind should contain ammonia as the alkalinizing and in part the emulsifying material for the asphalt. The rubber latex used is preferably one in which ammonia has been added to prevent coagulation and the alkaline ammonia bearing asphalt readily combines with the latex.

When the coated rubber material is dispersed in an asphalt emulsion, I also prefer to use substantially the same type of asphalt. I avoid asphalts which contain clay as an emulsifying or deflocculating agent, or those which contain soap or other agents of the same character. This type of asphalt is apt to leach out to some extent after it has been in place for a while and it also is less desirable as a bonding agent. I find, however, that when I employ hot asphalt not emulsified, I am able to employ some types of asphalt which would not be so satisfactory in emulsion form.

The pine oil tends to produce some tackiness in the asphalt and rubber combination surrounding the rubber and this is desirable. A large amount of oil of any kind, however, might have a deteriorating effect upon the rubber, although pine oil seems to be less damaging in this respect than mineral oils. For this reason, the asphalt should be substantially free of any oil fraction, which will tend to deteriorate the rubber. I find, however, that I may add the relatively small amount of pine oil to the asphalt or asphalt emulsion into which the prepared rubber is dispersed. This increases the tackiness of the asphalt and makes a better bond between structural members.

I find that the material so prepared can be deformed but will tend to return to its original position. In other words, it is somewhat elastic, expansible and compressible. When it adheres to a structural member such as the end of a concrete slab the structural member may be drawn to quite a considerable extent away from its associated structural member without causing the joint material to be broken or separated. On expansion in the other direction, the material is compressed and does not interfere in any appreciable or measurable way with the expansion.

I may apply the invention to a flexible mattress formed of relatively large concrete slabs joined together by articulated connections. This form of mattress is a type employed in river work for lining a bank and part of the river bottom to prevent the water from undermining a levee or bank. This large mattress is placed on what is known as a sinking barge and the slabs nearest the shore line are anchored up on the bank by means of anchoring cables. The sinking barge is then moved away from the bank and out from under the mattress, approximately ten or fifteen minutes being required after a mattress is assembled to sink it along the bank and toward the center of the stream. Various other structural features are added to the mattress to complete the protection work, but these additional features or matters of construction will not be referred to as they do not have a bearing on the present invention.

One of the difficulties encountered in the use of mattresses of this character to protect a river bank is that the water flowing past the cracks and particularly the relatively wide openings where the joints are made produce eddy currents which churn up the silt at the river bottom under the slabs, draw this silt out from under the slabs and finally so undermine them that the entire bank may collapse, sometimes more readily and rapidly than if the mattress had not been used. It has been suggested that some form of material be employed to fill the cracks and spaces between the individual structural members which form the mattress but heretofore no satisfactory joint material has been available. The difficulties encountered on this type of work are greater than with ordinary expansion joints for several obvious reasons. In launching the mattress the expansion joint is subjected to alternate compressions and extensions due to the fact that the mattress portions or structural members composing it will be bent or articulated first in one direction and then in another. Moreover a relatively rapid current mixed with silt and fine sand will tend readily to wash out and destroy many types of materials which otherwise might be of some value. There is the added difficulty of placing the joint material in position and setting it in a comparatively short time as is required due to the character of the work.

The joint material of my invention either used alone or with other adjuncts is suitable for use in this connection and will produce very good results.

In considering the use of the present invention for a river bank mattress, it should be noted that there is no necessity for the joint to remain intact indefinitely. After the mattress has lain in position for a period of time running from a few months to a couple of years depending upon conditions, it becomes so set and imbedded on the bottom and bank of the stream that the space between the structural members or concrete slabs will tend to be filled up and the entire mattress partly covered over with various forms of material including plant and fish life so that even though there were no joint material left, the water would do little damage. It is essential that the joint material last until this semi-permanent condition of the mattress has been effected.

What I claim as new and desire to protect by Letters Patent of the United States is:

1. The method of producing a material for use in an expansion joint, said method comprising grinding vulcanized semi-soft rubber to relatively small aggregates, immersing said rubber aggregates into a water emulsion of asphalt and rubber latex, drying the resulting mixture, and then dispersing the resulting mixture in asphalt.

2. The method of producing a material for use in an expansion joint, said method comprising grinding vulcanized semi-soft rubber to relatively small aggregates, immersing said rubber aggregates into a water emulsion of asphalt and rubber latex, drying the resulting mixture, and then dispersing the resulting mixture in an asphalt emulsion.

3. The method of producing a material for use in an expansion joint, said method comprising mixing relatively small aggregates of compressible material into a solution of asphalt and rubber latex, driving moisture from said mixture, and then dispersing the resulting mixture in asphalt.

4. The method of producing a material for use in an expansion joint, said method comprising mixing relatively small aggregates of compressible material into a solution of asphalt, rubber latex and pine oil, drying said mixture to tacky coated aggregate, and then dispersing the resulting mixture in asphalt.

5. The method of producing a material for use in an expansion joint, said method comprising mixing relatively small aggregates of semi-soft rubber into a solution of asphalt, rubber latex, and pine oil, drying said mixture to tacky coated rubber aggregate, and then dispersing the resulting mixture in asphalt.

6. The method of producing a material for use in an expansion joint, said method comprising mixing relatively small particles of semi-soft rubber into a solution of alkaline asphalt and alkaline rubber latex, driving moisture from said mixture, and then dispersing the mixture in asphalt.

GEORGE B. GAIENNIE.